United States Patent [19]
Geist

[11] Patent Number: 5,689,203
[45] Date of Patent: Nov. 18, 1997

[54] SELF-CALIBRATION CIRCUIT FOR PULSE-TRAIN TRANDUCER SIGNALS

[76] Inventor: Jon Geist, 4008 Fulford St., Olney, Md. 20832

[21] Appl. No.: 560,980

[22] Filed: Nov. 20, 1995

[51] Int. Cl.[6] .................................................. H01J 15/04
[52] U.S. Cl. .................. 327/187; 327/232; 327/241; 324/130; 324/601
[58] Field of Search ................... 327/113, 187, 327/232, 241, 342; 324/130, 74, 601, 202

[56] References Cited

U.S. PATENT DOCUMENTS

| | | | |
|---|---|---|---|
| 5,506,529 | 4/1996 | Baldwin | 327/113 |
| 5,585,750 | 12/1996 | Noguchi et al. | 327/113 |

FOREIGN PATENT DOCUMENTS

000813679  3/1981  U.S.S.R. ................... 327/122

Primary Examiner—Margaret Rose Wambach

[57] ABSTRACT

A self-calibration circuit for sensors and transducers that produce pulse-train outputs of the type having a count-until-disabled counter (250) which counts the number of pulses corresponding to a known value of the sensed or transduced quantity in a variable frequency pulse train during the time that a known number of pulses are counted in a reference pulse train by a frequency divider (210); the count accumulated by the count-until-disabled counter being stored, after accumulation, in a settable-divisor frequency divider (220 or 240) which can provide both calibrated sensor pulse-train outputs and calibration pulse-train outputs having the same frequency as the calibrated sensor pulse-train output at known values of the sensed parameter.

12 Claims, 4 Drawing Sheets

SELF-CALIBRATION CIRCUIT FOR PULSE-TRAIN TRANDUCER SIGNALS

BACKGROUND-FIELD OF INVENTION

This invention relates to circuits for use with sensors and transducers, specifically to a self-calibration circuit for sensors and tranducers that produce pulse-train outputs.

BACKGROUND-DESCRIPTION OF PRIOR ART

The principle reason why Artificial Intelligence (AI) has not lived up to its early expectations is not a lack of brains (computer power) but a lack of sense (sensors for communicating information about the environment into the computer). In order to reap the potential of AI, sensors must be so inexpensive that they become ubiquitous in consumer products the way that microprocessors are. This cannot happen until the prices of sensors are substantially decreased.

Currently, there are a number of programs throughout the world that are aimed at reducing the cost of sensors. Among these, one of the most promissing is being carried out by Prof. Baltes and his students at the Swiss Technical University (ETH) in Zurich. This program aims to develop sensors precursors that can be fabricated at a standard silicon foundry and then be converted into a sensor with a minimum amount of low-cost post-processing. Low-Cost access to signal processing circuits that can be co-integrated with the sensor on the same chip is a by-product of this approach.

The Zurich program has already demonstrated the feasibility of a large number of different types of sensors including humidity, air flow, volatile vapor, ultrasonic, infrared, ultraviolet, and magnetic. This program has also designed a general type of signal processing circuit that is ideal for many of these sensor types. At its most basic level, this circuit produces a pulse-train output for further processing. The combination of this circuit and these sensors promises a significant reduction in sensor cost. However, a reduction in sensor cost by itself is not enough to make sensors ubiquitous. There are other costs involved in using sensors besides the actual cost of the sensor. These include the cost of packaging, calibration, and interfacing. In the past, the cost of the sensor has determined the costs that can be tolerated for packaging, calibration, and interfacing. However, for sensors to become ubiquitous, these costs must be reduced commensurate with the reduction in sensor cost.

The hidden costs of sensor calibration and interfacing can be understood in terms of the distinction between sensors and transmitters that has been adopted by the environmental humidity and temperature measurement communities. According to this distinction, a sensor is a device that puts out a signal that varies with some sensed parameter like temperature or humidity. A transmitter, on the other hand, is a device that puts out a signal that varies linearly with the sensed parameter from one specified, device-independent value at one value of the sensed parameter to a different, device-independent value at a second value of the sensed parameter. As a very rough approximation, temperature and humidity transmitters cost three times as much as moderate priced temperature and humidity sensors, and tens times as much as low cost temperature and humidity sensors.

Even though they cost so much more than sensors, there is a healthy market for transmitters because the savings incurred when interfacing a transmitter instead of a sensor with a system often more than make up for the extra cost of the transmitter. Even when a linear sensor comes with a calibration certificate stating the values of the two resistors that are needed to trim its gain and zero offset to the desired values, it is still very expensive to interface a linear sensor with a low-cost system. To see this consider what must be done to interface such a sensor.

First the person doing the interfacing must keep track of which calibration certificate goes with which sensor during insertion of the sensor into the system, then he or she must pick resistors of the specified values and insert them into the system. This must be done differently for each sensor, so it is a very expensive process whether done by hand or with robots.

OBJECTS AND ADVANTAGES

Accordingly, the objects and advantages of the present invention are:
(a) to provide a self-calibration circuit for pulse-train signals;
(b) to provide a self-calibration circuit that can be cointegrated onto a chip with a sensor and other signal processing and control electronics;
(c) to provide a self-calibration circuit that supports inexpensive batch-mode calibration;
(d) to provide a self-calibration circuit that stores its calibration results within the circuit;
(e) to provide a self-calibration circuit whose calibration results are available at the output of the circuit;
(f) to provide a self-calibration circuit whose calibration results can be sent off-chip with a low pin count;
(g) to provide a self-calibration circuit whose calibration results lend themselves to both inexpensive off-chip and on-chip processing into a calibrated sensor output signal for higher-level processing by a display or other type of circuit. Further objects and advantages will become apparent from the ensuing description and drawings.

REFERENCE NUMERALS IN DRAWINGS 10 integrated circuit chip
200 self-calibration circuit
201 data-output bus
300 sensor circuit
350 data-input bus
400 control circuit
450 control bus
460 output-selection bus
500 multiplexer circuit
600 calibration-calculation circuit
205 electronic switch
210 frequency divider set to divide by M
215 electronic switch
220 setable-divisor frequency divider set to divide by N

3

230 SPDT electronic switch
240 setable-divisor frequency divider set to divide by S
245 electronic switch
250 count-until disabled counter
255 electronic switch
260 multi-pole, double-throw electronic switch
270 SPDT electronic switch
290 SPDT electronic switch
1000 microprocessor
1100 L register
1200 $C_{max}$ register
1300 $C_{ref}$ register
1400 $C_{sen}$ register
1500 $T_M$ register
1600 $T_{out}$ register

DESCRIPTION-FIGS. 1–3

Figure 1A:
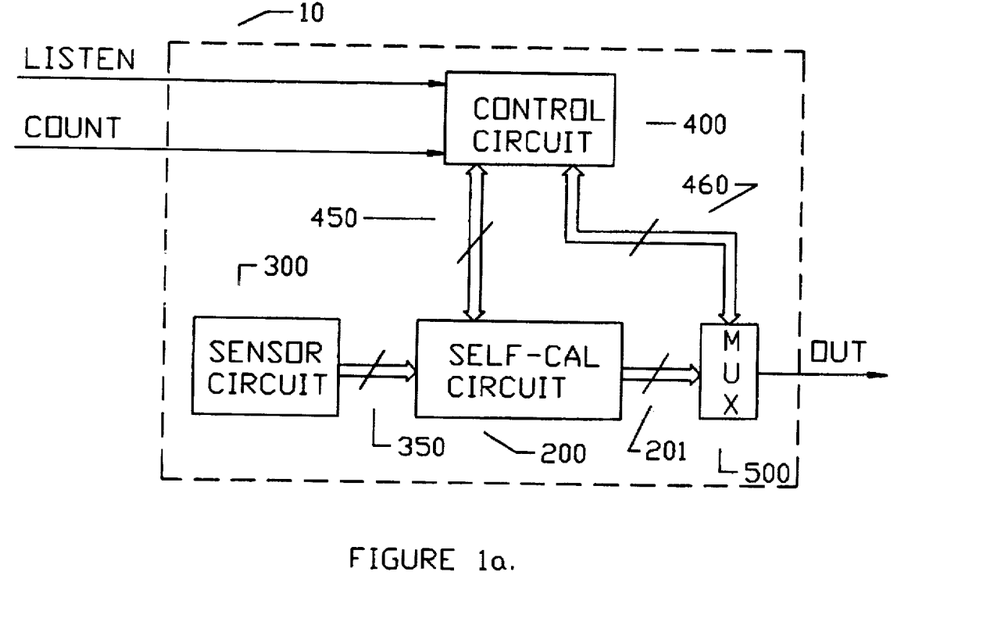
FIG. 1 illustrates the integration of sensor, control, and self-calibration circuits onto a single chip in two possible embodiments.

A typical application of the present invention in an integrated circuit is shown in FIG. 1a. A self-calibration circuit 200 is connected to a sensor circuit 300 by an input-data bus 350, and to a control circuit 400 by a control bus 450. The output of the self-calibration circuit 200 is connected to a multiplexer (MUX) 500 by an output-data bus 201, and the control circuit 400 is also connected to the MUX 500 by an output-selection bus 460. Two lines (LISTEN and COUNT) provide instructions to the control circuit from off-chip, and a third line (OUT) sends the output of the MUX 500 off chip. Thus only three pins are needed to deliver the sensor-output and self-calibration signals to the system in which the sensor is embedded, and to receive instructions from that system.

Figure 1B:
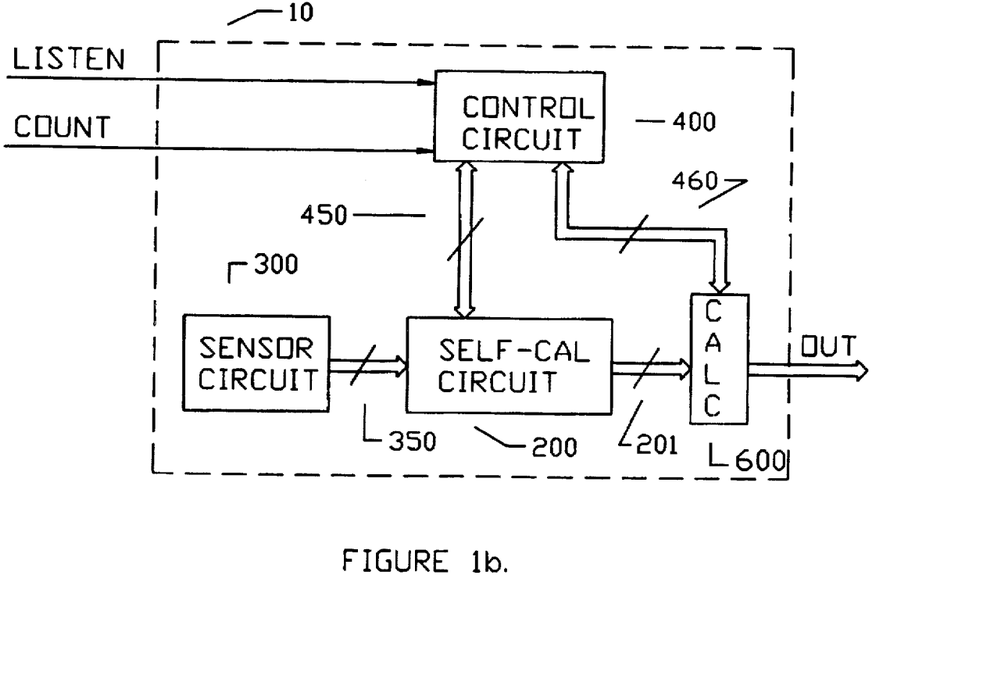

FIG. 1b shows a slightly different application in which the MUX 500 of FIG. 1a is replaced by a calibration-calculation (CALC) circuit 600. The CALC circuit 600 processes the output of the self-calculation circuit to produce a calibrated signal that is delivered off-chip by an output (OUT) bus. The remainder of the description will be given in terms of FIG. 1a. Those of ordinary skill in the art are able make the minor changes to the description given below to apply it to FIG. 1b.

Figure 2:
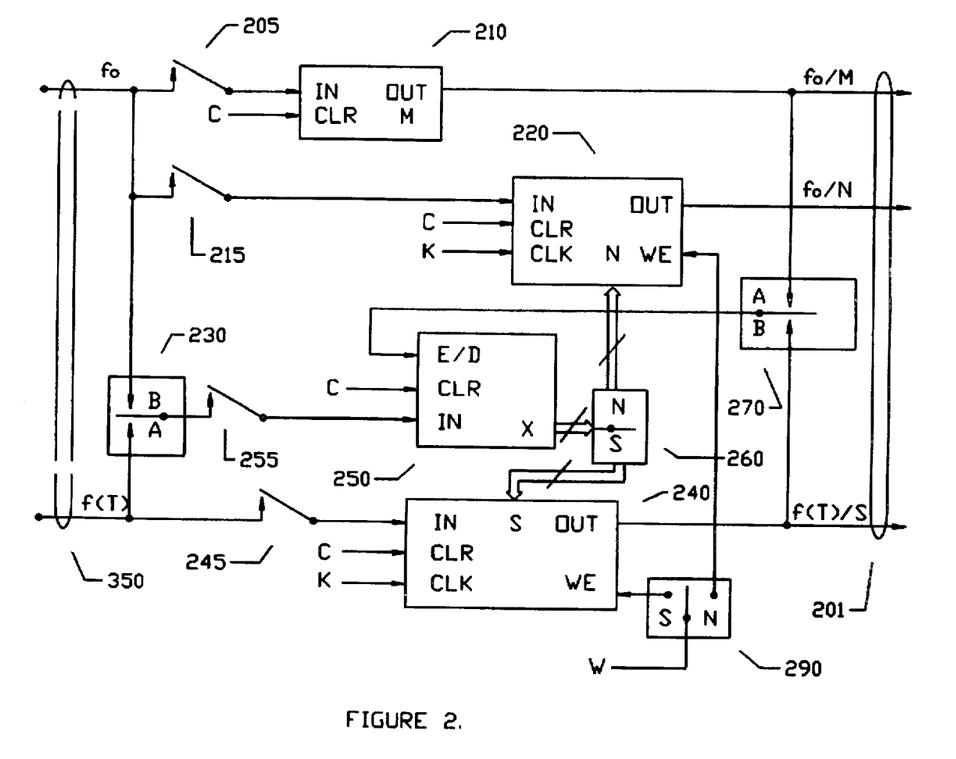
FIG. 2 shows the self-calibration circuit of FIG. 1 in more detail.

A preferred embodiment of the present invention is shown in FIG. 2 for use with a temperature-sensor. An input line carrying a reference pulse-train of frequency $f_0$ is connected to an electronic switch 205, an electronic switch 215, and to the B throw of a SPDT electronic switch 230. The switch 205 is connected to the pulse-counting input of a frequency divider set to divide by M (divide-by-M counter circuit) 210. The switch 215 is connected to the pulse-counting input of a setable-divisor, frequency divider set to divide by N (divide-by-N counter circuit) 220.

An input line carrying a temperature-dependent, sensor-output pulse-train having frequency f(T), where T is the sensed parameter (chip temperature in this embodiment) is connected to the pulse-counting input of a setable-divisor, frequency divider set to divide by S (divide-by-S counter circuit) 240 through an electronic switch 245, and to the A throw of the switch 230. In the embodiment illustrated here, the two lines carrying the pulse trains of frequency $f_0$ and f(T) constitute the input-data bus 350 that connects the sensor circuit 300 to the self-calibration circuit 200 in FIG. 1.

The pole of the switch 230 is connected to the pulse-counting input of a count-until-disabled counter 250 through an electronic switch 255. Each of the output-count (X) lines of the counter 250 is connected to a pole of a multi-pole, double-throw electronic switch 260. The N-side throws of the switch 260 are connected to the set-N input of the divide-by-N counter 220, and the S-side throws of the switch 260 are connected to the set-S input of the divide-by-S counter 240.

The output of the divide-by-M counter 210 is one line in the output-data bus 201 connecting the self-calibration circuit 200 to the MUX circuit 500 in FIG. 1. Similarly, an output line from the divide-by-N counter 220 and an output line from the divide-by-S counter 240 are second and third lines, respectively, in the output-data bus 201 connecting the self-calibration circuit 200 to the MUX circuit 500. Thus, for the embodiment shown in FIG. 2, the output-data bus that connects the self-calibration circuit 200 to the MUX 500 in FIG. 1 has three lines carrying pulse-trains of frequencies $f_0/M$, $f_0/N$, and $f(T)/S$, respectively.

The output of the divide-by-M counter 210 is also connected to the A throw of an electronic switch 270. The output of the divide-by-S counter 240 is also connected to the B throw of the switch 270. The pole of the switch 270 is connected to the enable/disable (E/D) input of the count-until-disabled counter 250.

The embodiment of a self-calibration circuit shown in FIG. 2 also has the input-control bus 450 shown in FIG. 1. A W line of this bus is connected to the pole of a SPDT electronic switch 290. The S throw of this switch is connected to the write-enable input (WE) of the count-to-S counter 240, and the N throw of the switch 290 is connected to the WE input of the count-to-N counter 220. Other lines in the input-control bus include a control line C, a control line K, and other control lines (not shown) to set the switches 205, 215, 230, 245, 255, 260, 270, and 290. The C control line of this bus is connected to the clear-count inputs (CLR) of the counters 210, 220, 240, and 250. The K control line of this bus is connected to the clocked-write-N input (CLK) of the divide-by-N counter 220 and to the clocked-write-S input (CLK) of the divide-by-S counter 240.

PROPERTIES OF THE COUNTERS

The integer value of M in the divide-by-M counter 210 in FIG. 2 is either hard wired or set by the control circuit 400 in FIG. 1. The output of this counter changes state on negative-going pulses at its input (In), and the count is reset to zero when the CLR input is pulsed low.

The value of N in the divide-by-N counter 220 is set by clocking it into a register for storage when WE is low and the CLK input is pulsed low. Otherwise, this counter works the same way as the divide-by-M counter 210. The divide-by-S counter 240 works the same way as the divide-by-N counter 220.

Some types of sensors can be calibrated in-situ. In this case it is not necessary to maintain the sensor calibration between uses, so the registers for storing N and S can be volatile. On the other hand, many types of sensors must be placed in one or more controlled environments in order to be calibrated. In this case, the calibration must be maintained when the sensor is turned off (during shipping for example) and EPROM, FLASH memory, or other non-volatile technologies, such as on-chip or in-package power, must be used for the registers that store N and S.

The count-until-disabled counter 250 counts only when the enable/disable (E/D) input is low, and the X output contains the accumulated count encoded on the Output data bus. The output of this counter is also reset to zero when the CLR input is pulsed low.

Many factors affect the accuracy of the self-calibration values of S and N, depending upon the type of sensor and the calibration procedure. However, the accuracy of S and N can be no better than plus or minus 1 because S and N are integers. In other words, both S and N must be greater than 100 if they are to be accurate to plus or minus one-percent of value. Other sources of error will, of course, add to this uncertainty.

Those of ordinary skill in the art are able to design circuits meeting the functional requirements of the counters 210, 220, 240, and 250 described above, as well as the electronic switches shown in FIG. 2.

Figure 3:
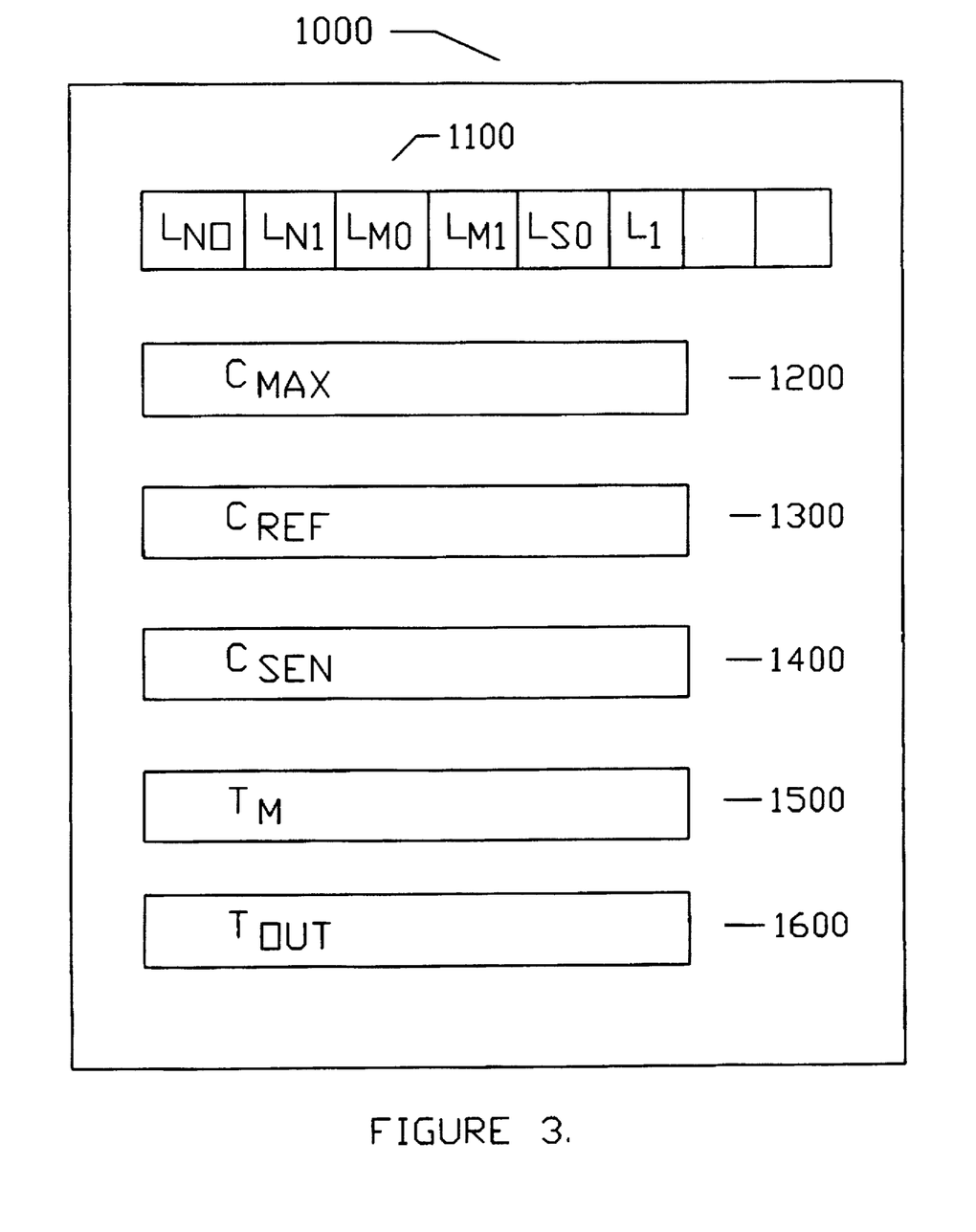
FIG. 3 shows a microprocessor with registers for accumulating counts to calculate the calibrated signal output from the self-calibration circuit of FIG. 2.

FIG. 3 illustrates a microprocessor 1000 that comprises an L register 1100, a $C_{max}$ register 1200, a $C_{ref}$ register 1300, a $C_{sens}$ register 1400, a $T_M$ register 1500, and a $T_{out}$ register 1600. The L register 1100 has bits $L_{N1}$, $L_{M1}$, and $L_{S1}$ to store the most recently read values of the logic states on the three lines with frequencies $f_0/N$, $f_0/M$, and $f_0/S$, respectively, that make up the data-output bus 201. The L register 1100 also has bits $L_{N0}$, $L_{M0}$, and $L_{S0}$ to store the next to most recent values of the logic states on the same three lines. The instantaneous logic states on these lines will be referred to as $L_N$, $L_M$, and $L_S$ to distinguish them from the values stored in the L register 1100.

OPERATION-FIGS. 1-4

Refer again to FIG. 1. When the LISTEN line to the control circuit 400 is high, the control circuit ignores any input on the COUNT line. When the LISTEN line is low, the control circuit 400 counts the number of pulses on the COUNT line. When the LISTEN line goes high again, the control circuit 400 decodes the accumulated count as an instruction, executes the instruction, and then resets the counter to zero. Typical instructions are to connect one of the output lines in the output-data bus 201 of the self-calibration circuit 200 to the input of the MUX 500, to set the control line W in FIG. 2 high or low, to put a pulse on one of the control lines C or K, to open or close one of the switches 205, 215, 245, or 255, to select either the A or B throws of the switches 230 and 270, and to select either the S or N throws of the switches 260 and 290. Those of ordinary skill in the art are able to design this type of control circuit.

Some types of sensors require a one-point calibration, others require a two-point calibration, and still others require calibration at three or more points. The embodiment shown in FIG. 2 is designed to support a two point calibration. There are two phases to self-calibration with this embodiment, one for each point at which a calibration is carried out.

PHASE I OF SELF-CALIBRATION

In the first phase of self-calibration, the integrated circuit chip 10 of FIG. 1 is placed in a controlled temperature environment at temperature $T_M$. Once the temperature of the integrated circuit chip 10 in FIG. 1 has reached equilibrium, the MUX 500 is connected to the self-calibration output-data line that carries the pulse train of frequency $f_0/M$ in FIG. 2, the switches 205 and 255 are closed, the switches 215 and 245 are opened, and the poles of the switches 230 and 270 are set to the A position, and the poles of the switches 260 and 290 are set to the S position.

After the switches are set, the C line is pulsed low to reset the counters. This sets the output line of the divide-by-M counter 210 low, which enables the count-until-disabled counter 250. At this point, the divide-by-M counter 210 starts to count the pulses in the pulse train of frequency $f_0$ and the count-until-disabled counter 250 starts to count the pulses in the pulse train of frequency $f(T_M)$. This continues until the count accumulated by the divide-by-M counter 210 reaches M, at which point the output of this counter Goes high. This stops the count-until-disabled counter 250 from any further counting. At the same time, the low-to-high transition on the output of the divide-by-M counter 210 is detected off-chip. After this, instructions are sent from off chip to open the switch 205, set the W control line low, and to pulse the K line low to write the value stored in the X output of the count-until-disable counter 250 into the S register of the divide-by-S counter 240. Thus S is the number of pulses that occur in the pulse train of frequency $f(T_M)$ during the time that it takes for M pulses to occur in the pulse train of frequency $f_0$.

As a result of the procedure described above, the calibration frequency $f_0/M$ is equal to the sensor frequency $f(T)/S$, when $T=T_M$. Thus, following the first phase of the self-calibration, it is possible to use the MUX 500 in FIG. 1 to select between a signal with a pulse-train frequency $f(T)/S$ proportional to the sensor output frequency $f(T)$ and a signal with a calibration pulse-train frequency given by $f_0/M=f(T_M)/S$. (1)

If a sensor that required only a one-point calibration were being used, then the self-calibration would be complete, and the integrated circuit/sensor chip 10 of FIG. 1 would be ready for use as described later in this patent. In this case, there would be no need for the divide-by-N counter 220 and the switches 215, 230, 260, 270, and 290. However, the embodiment shown in FIG. 2 is designed for a two-point self-calibration, the second phase of which is described next.

PHASE 2 OF SELF-CALIBRATION

In the second phase of self-calibration, the integrated circuit chip 10 of FIG. 1 is placed in a controlled temperature environment at temperature $T_N$. Once the temperature of the integrated circuit 10 in FIG. 1 has reached equilibrium, the MUX 500 is connected to the self-calibration output-data line that carries the pulse train of frequency $f(T)/S$, the switches 245 and 255 in FIG. 2 are closed, the switches 205 and 215 are opened, the poles of the switch 230 and 270 are set to the B position, and the poles of switches 260 and 290 are set to the N position.

After these switches are set, the C line is pulsed low to reset the counters. This sets the output line of the divide-by-S counter 240 low, which enables the count-until-disabled counter 250. At this point, the divide-by-S counter 240 starts to count the pulses in the pulse train of frequency $f(T_N)$ and the count-until-disabled counter 250 starts to count the pulses in the pulse train of frequency $f_0$. This continues until the count accumulated by the divide-by-S counter 240 reaches S, at which point the output of this counter Goes high, which stops the count-until-disabled counter 250 from any further counting. At the same time, the low-to-high transition on the output of the divide-by-S counter 240 is detected off-chip. After this, instructions are sent from off chip to open switch 245, set the W control line low, and to pulse the K line low to write the value stored in the X output of the count-until-disable counter 250 into the N register of the divide-by-N counter 220. Thus N is the number of pulses that occur in the pulse train of frequency $f_0$ during the time that it takes for S pulses to occur in the pulse train of frequency $f(T_N)$.

As a result of the procedure described above, the calibration frequency $f_0/N$ is equal to the sensor frequency $f(T)/S$, when $T=T_N$. Thus, following the second phase of the self-calibration, it is possible to use the MUX 500 in FIG. 1 to select among three signals. The first is the pulse-train of frequency $f(T)/S$ proportional to the sensor output frequency f(T), the second is the calibration pulse train of frequency $f_0/M$ that gives the frequency of f(T)/S when T is the calibration temperature $T_M$, and the third is the calibration pulse train of frequency $f_0/N=f(T_N)/S$ (2) that gives the frequency of f(T)/S when T is the calibration temperature $T_N$.

It will be apparent to those skilled in the art that if f(T) is linear with T, if $T_M$ is set to the zero-temperature point in some unit system, and if $T_N>T_M$, then $f_0/M$ and $f_0/N-f_0/M$ would be the respective zero-offset and gain calibration frequencies.

USE OF SELF-CALIBRATION RESULTS

If the sensor frequency f(T) is a linear function of chip temperature (or any other sensed parameter) T, as is usually the case when a two-point calibration is sufficient, then the calibrated signal $T_{out}$ is given by $$T_{out} = T_M + \frac{(C_S - C_M)(T_N - T_M)}{C_N - C_M}, (3)$$

where $C_S$ is the count accumulated from the signal with frequency f(T)/S during some period of time, and $C_N$ and $C_M$ are the counts accumulated during the same period of time from the signals with frequencies $f_0/N$ and $f_0/M$, respectively. In the General case, the quantity $T_{out}$ can be calculated either on-chip or off-chip, with the latter choice being made when sensor-chip size and pin count must be kept to a minimum.

Figure 4:
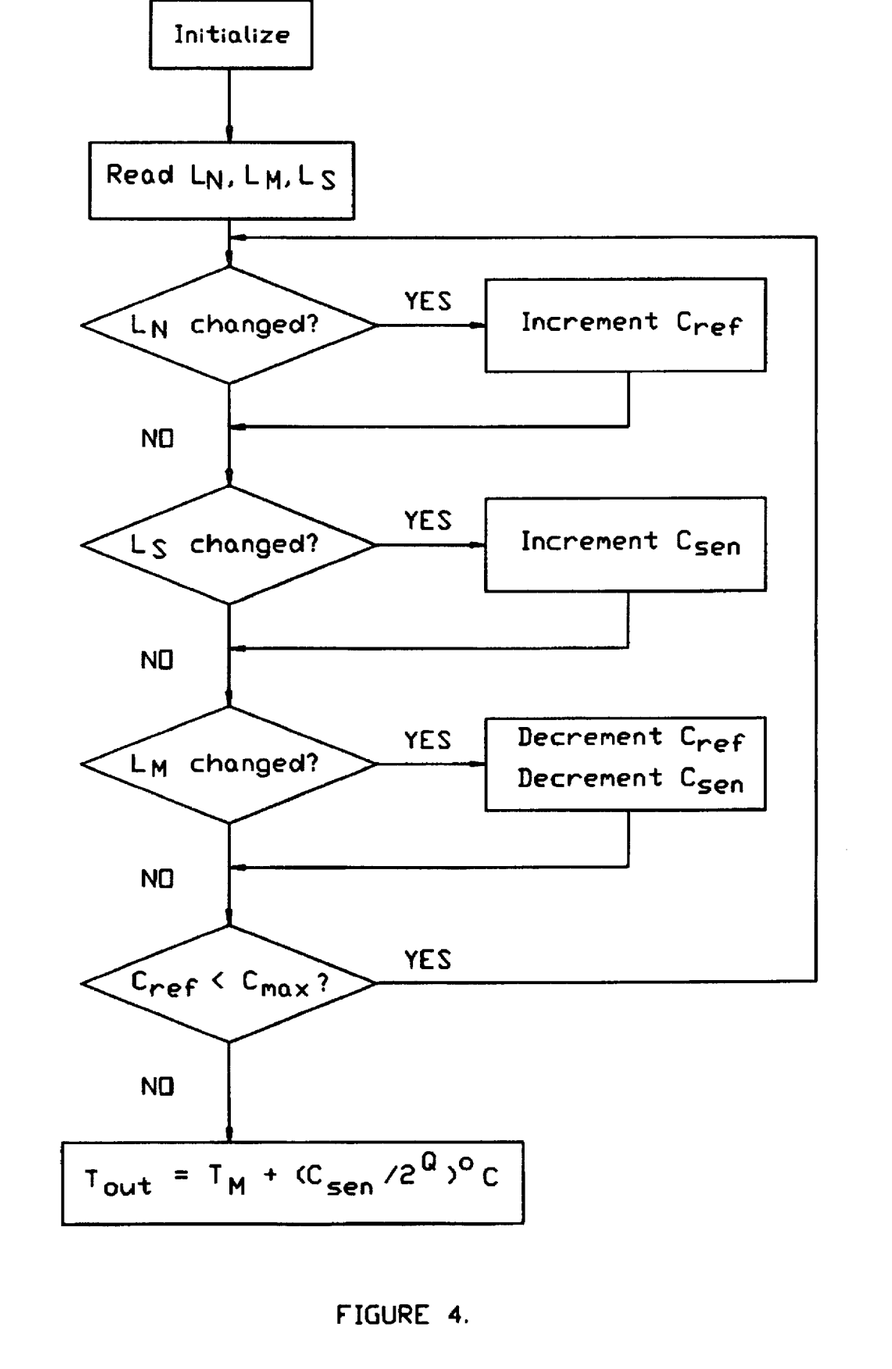
FIG. 4 is a flow chart illustrating how the calibration and sensor signals from the self-calibration circuit of FIG. 2 can be used to calculate a calibrated sensor signal without division or multiplication using the registers shown in FIG. 3.

Notice that whether it is calculated on-chip or off-chip, eq. (1) can be implemented in such a way that $T_{out}$ is accumulated without using division or multiplication, but only subtraction, addition, incrementation, decrementation, and shifting bits left or right. Even with an off-chip calculation, this can reduce the cost of interfacing the sensor-chip signal in certain situations since it allows very inexpensive microprocessors or other digital logic circuits to be used in the interface circuit. The only disadvantage of this method is that it requires that $T_M$ and $T_N$ both be non-negative, and it produces an accurate result only when $T_{out}$ is greater than the smaller of $T_M$ and $T_N$. An example of an off-chip calculation is presented below:

The $C_{ref}$ register 1300 and the $C_{sen}$ register 1400 in the microprocessor 1000 of FIG. 3 accumulate counts according to the flowchart shown in FIG. 4. During the initialization step, the microprocessor 1000 sets $C_{max}=2Q(T_N-N_M)$, (4) where Q is a positive integer, sets the L register 1100 to zero, instructs the control circuit 400 through the LISTEN and COUNT lines in FIG. 1 to close switches 205, 215, and 245 in FIG. 2 and then instructs the control circuit 400 to pulse the C line low to reset all of the counters. Note that multiplication by $2^Q$ in eq. (4) can be accomplished by shifting the contents of the $C_{max}$ register 1300 Q bits to toward the high bit side of the register.

Once initialization is complete, the microprocessor 1000 then executes the next step in the flowchart of FIG. 4, which is to read the new values of the logic states $L_N$, $L_M$, and $L_S$ into the bits $L_{N1}$, $L_{M1}$, $L_{S1}$ of register 1100. Once the new values of the logic states $L_N$, $L_M$, and $L_S$ have been read they are compared with the old values stored in the bits $L_{N0}$, $L_{M0}$, and $L_{S0}$ of register 1100 as indicated in FIG. 4. If any of them have changed, then the appropriate register $C_{ref}$ 1300 or $C_{sen}$ 1400 is incremented or decremented as indicated in FIG. 4. Finally, the count accumulated in the register $C_{ref}$ 1400 is compared with that accumulated in the register $C_{max}$ 1200. If $C_{ref}<C_{max}$, then the loop following the initialization step is repeated as indicated in FIG. 4. Otherwise the loop is exited, and $T_{out}$ is calculated and sent to some other circuit such as an LCD display circuit.

As a concrete example, suppose that
$f_0=200,000$ Hz, (5)
M=2000, (6)
f0/M=100 Hz. (7)
Further suppose that
f(T)=10,000 Hz+1,000 T Hz/° C. (8)
and that during the first phase of self-calibration, $T_M=10°$ C.
Therefore, according to eq. (8),
$f(T_M)=20,000$ Hz, (9) and according to eq. (1),
$S=M [f(T_M)/f_0]=200$. (10)
Next suppose that during the second phase of self-calibration, $T_N=90°$ C. Therefore, according to eq. (8),
$f(T_N)=100,000$ Hz, (11) and according to eq. (2),
$N=S [f_0/f(T_N)]=400$, (12) so
$f_0/N=500$ Hz. (13)

With self-calibration complete, switches 205, 215, and 245 in FIG. 2 are closed, switch 255 is opened, so the calibration signals $f_0/N=500$ Hz, and $f_0/M=100$ Hz, as well as the sensor signal f(T)/S are available on the output-data bus 201 in FIGS. 1 and 2.

Suppose now that the circuit of FIG. 1 is interfaced to a microprocessor that is running at a high enough frequency so that it can do all of the steps in the loop between the initialization step and the calculation of $T_{out}$ that is shown in the flow chart of FIG. 4 in less than 0.5 ms. This assures that none of the logic levels $L_N$, $L_M$, and $L_S$ will change state more than once between readings.

Finally suppose that T=50° C. at some particular time during use of the sensor chip 10 in FIG. 1 in some specific application, and that Q in eq. (4) was chosen to be 5 so that $C_{max}=32 (90-10)=32 (80)=2560$. (14)

Following the initialization step in FIG. 4, it will take a certain amount of time t for the count $C_{ref}$ to reach the count $C_{max}$ and exit the loop. This time can be calculated from $2560=C_{max}=C_{ref}=t (f_0/N-f_0/M) =t (500$ Hz$-100$ Hz$)=t$ 400 Hz. (14)

Thus t=6.4 s. During this time, $C_{sen}$ will reach a count given by $$C_{sen} = t [(f(T)/S - f_0/M)] = t [300 \text{ Hz} - 100 \text{ Hz}] \quad (15)$$
$$= t 200 \text{ Hz} = 1280.$$

Also, since $C_{ref}=C_{max}$, the loop will be exited, and $T_{out}$ will be calculated as $$T_{out} = T_M + C_{sen}/32 = 10° \text{ C.} + (1280/32)°\text{C.}$$
$$= 50° \text{ C.},$$

which is the value of T as required. Note that division by $2^Q$ in the calculation of $T_{out}$ can be accomplished by shifting $C_{sen}$ Q bits in the direction of the least significant bit in the binary representation of $C_{sen}$ instead of actual division. Thus no multiplication or division is needed to implement the algorithm in FIG. 4. Of course, it might be more convenient to use these operations if they are available on the actual microprocessor or other interface circuit being used to read the logic levels from the self-calibration circuit.

A major advantage of the self-calibration circuit of FIG. 2 is the fact that it provides an output format that minimizes the number of pins needed in packaging. This will be very important in certain applications.

However, there are other applications in which multiplexed, binary-coded or RS232 output formats will be needed. In this case, there is no need to send sensor and calibration pulse trains off-chip, and it will probably prove convenient to implement the algorithm of FIG. 4 on-chip, and send $T_{out}$ off the chip in one of these formats as shown in FIG. 1b. It is another major advantage of the self-calibration circuit of FIG. 2 that its output can be converted into a calibrated signal without division or multiplication. This is important because it simplifies and reduces the cost of on-chip implementions. Those of ordinary skill in the art are able to design circuits to calculate $T_{out}$ as defined in eq. (3) for on-chip implementation with minor modifications to the flow chart of FIG. 4.

Conclusions, Ramifications, and Scope

Thus the reader will see that the self-calibration circuit of this invention provides a circuit that, through use of the proper sequence of steps, converts a reference-frequency pulse train and a variable-frequency pulse train from a sensor into two output pulse trains: a new variable-frequency pulse train whose frequency is proportional to that from the sensor, and a calibration pulse-train whose frequency corresponds to the frequency of the new variable-frequency pulse train at one or more known values of the sensed parameter.

The reader will also see that this self-calibration circuit is very robust against common sources of error in instrumentation. For instance, provided that the sensor signal is derived from the reference signal, frequency drift of the reference signal is completely compensated in the calibration signals. Moreover, the calibrated value of the sensored parameter can be calculated from the self-calibration circuit output pulse trains with algorithms that can be inexpensively implemented either on-chip or off-chip. Finally, the self-calibration circuit is made from simple CMOS logic that is readily available from standard CMOS foundry processes allowing integration on the same chip with any sensor made in a standard CMOS foundry process.

While the above description contains many specificities, these should not be construed as limitations on the scope of the invention, but rather as an exemplification of one prefered embodiment thereof. Many other variations are possible.

Calibrations at more than two values of the sensor input quantity T will usually be required if the sensor output frequency f(T) is not linearly related to T. Those skilled in the art will be able to support calibration at another value of T, $T_Z$ for instance, by adding a count-to-Z counter to the circuit of FIG. 2, Z-position throws to the switches 260 and 290, and by connecting these throws to the set-Z input the count-to-Z counter. An additional switch would also be needed to connect the $f_0$ line to the input of the count-to-Z counter, and an additional output line for $f_0/Z$ would have to be added to the output-data bus 201. This procedure can be used to add as many additional components to support self-calibration at additional values of T as required in any particular application.

In the prefered embodiment shown in FIG. 2, the only change in $f_0/M$ will be due to drift of $f_0$ with environmental conditions. Thus if $f_0$ is known and stable, and if M is also known as is readily acheived by those skilled in the art, then every self-calibration circuit will put out the same frequency $f(T)/S=f_0/M$ when $T=T_M$ regardless of the variation in $f(T_M)$ from sensor to sensor. This is useful if $f_0$ and the sensor gain vary little from sensor chip to sensor chip.

Note, however, that with the self-calibration circuit of FIG. 2, very large drifts in $f_0$ are tolerable for sensors in which $f(T_M)$ is derived from $f_0$, as will usually be the case. In such cases, there may be no benefit to fixing M and it may prove more useful to fix S. Those skilled in the art will be able to make the minor modifications to FIG. 2 to accomplish this.

Finally, note that the count-to-M counter can be eliminated and that S can be fixed for sensors having variable gain but no zero-offset. On the other hand, the count-to-N counter can be eliminated and M fixed for sensors with a variable zero-offset but a fixed gain and a known, stable, reference frequency $f_0$.

Accordingly, the scope of the invention should be determined not by the embodiment(s) illustrated, but by the appended claims and their legal equivalents.

I claim:

1. A self-calibration circuit, comprising
   (a) a first frequency-divider circuit comprising a pulse-train input port and a reduced-frequency output port,
   (b) a count-until-disabled counter comprising a pulse-train input port, a enable-disable input port, and an accumulated-count output-bus port,
   (c) a second frequency-divider circuit comprising a pulse-train input port, a set-divisor input-bus port, a write-divisor-clock input port, and a reduced-frequency output port,
   (d) a line means connecting said reduced-frequency output port of said first frequency-divider circuit to said enable-disable input port of said count-until-disabled circuit,
   (e) a bus means for connecting said accumulated-count output-bus port of said count-until-disabled circuit to said set-divisor input-bus port of said second frequency-divider circuit,
   wherein a count accumulated by said count-until-disabled counter during a period of time defined by the signal on said reduced-frequency output port of said first frequency-divider counter is read from said set-divisor input-bus port and stored by said second frequency-divider circuit when triggered by a pulse on said write-divisor-clock input.

2. The self-calibration circuit of claim 1, wherein a first pulse-train input line is connected to said pulse-train input port of said first frequency-divider circuit through a switch.

3. The self-calibration circuit of claim 1, wherein a second pulse-train input line is connected to said pulse-train input port of said count-until-disabled circuit through a switch.

4. The self-calibration circuit of claim 1, wherein said line means comprises a switch.

5. The self-calibration circuit of claim 1, wherein said bus means comprises multi-section switch.

6. The self-calibration circuit of claim 5, further comprising a third frequency-divider circuit comprising a
   (a) a pulse train input port,
   (b) a set-divisor input-bus port,
   (c) a write-divisor-clock input port,
   (d) a reduced-frequency output port,
   wherein said bus means connects said accumulated-count output-bus port of said count-until-disabled circuit to said set-divisor input-bus port of said third frequency-divider circuit.

7. The self-calibration circuit of claim 6, wherein said first pulse-train input line is connected to said pulse train input port of said third frequency-divider circuit through a switch.

8. The self-calibration circuit of 6, wherein
   (a) said self-calibration circuit is in functional relationship with a timer circuit means for establishing a time interval, (b) said reduced-frequency output port of said third frequency-divider circuit is in functional relationship with a register means for storing the number of pulses occurring on said reduced-frequency output port of said third frequency-divider circuit during said time interval.

9. The self-calibration circuit of 1, wherein
(a) said self-calibration circuit is in functional relationship with a timer circuit means for establishing a time interval.
(b) said reduced-frequency output port of said first frequency-divider circuit is in functional relationship with a register means for storing the number of pulses occurring on said reduced-frequency output port of said first frequency-divider circuit during said time interval.

10. The self-calibration circuit of 1, wherein
(a) said self-calibration circuit is in functional relationship with a timer circuit means for establishing a time interval.
(b) said reduced-frequency output port of said second frequency-divider circuit is in functional relationship with a register means for storing the number of pulses occurring On said reduced-frequency output port of said second frequency-divider circuit during said time interval.

11. The self-calibration circuit of 1, wherein said self-calibration circuit is co-integrated onto an integrated circuit chip with a reference pulse-train generator.

12. The self-calibration circuit of 1, wherein said self-calibration circuit is co-integrated onto an integrated circuit chip with a sensor pulse-train generator.

* * * * *